United States Patent
Mylius et al.

(10) Patent No.: US 9,535,695 B2
(45) Date of Patent: Jan. 3, 2017

(54) COMPLETING LOAD AND STORE INSTRUCTIONS IN A WEAKLY-ORDERED MEMORY MODEL

(71) Applicant: Apple Inc., Cupertino, CA (US)

(72) Inventors: John H. Mylius, Gilroy, CA (US);
Rajat Goel, Saratoga, CA (US);
Pradeep Kanapathipillai, Santa Clara, CA (US); Hari S. Kannan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 888 days.

(21) Appl. No.: 13/750,942

(22) Filed: Jan. 25, 2013

(65) Prior Publication Data
US 2014/0215190 A1 Jul. 31, 2014

(51) Int. Cl.
*G06F 9/30* (2006.01)
*G06F 9/38* (2006.01)

(52) U.S. Cl.
CPC ......... *G06F 9/30043* (2013.01); *G06F 9/3834* (2013.01); *G06F 9/3836* (2013.01); *G06F 9/3838* (2013.01); *G06F 9/3855* (2013.01)

(58) Field of Classification Search
None
See application file for complete search history.

(56) References Cited

U.S. PATENT DOCUMENTS

| | | | | |
|---|---|---|---|---|
| 5,467,473 A | * | 11/1995 | Kahle | G06F 9/3834 712/216 |
| 5,751,983 A | * | 5/1998 | Abramson | G06F 9/3834 712/216 |
| 5,784,586 A | | 7/1998 | Simone et al. | |
| 5,854,914 A | * | 12/1998 | Bodas | G06F 9/3816 712/200 |
| 5,898,854 A | * | 4/1999 | Abramson | G06F 9/30043 711/135 |

(Continued)

OTHER PUBLICATIONS

'Late-Binding: Enabling Unordered Load-Store Queues' by Simha Sethumadhavan et al., International Symposium on Computer Architecture 2007.*

(Continued)

*Primary Examiner* — Steven Snyder
(74) *Attorney, Agent, or Firm* — Meyertons, Hood, Kivlin, Kowert & Goetzel, P.C.

(57) ABSTRACT

Techniques are disclosed relating to completion of load and store instructions in a weakly-ordered memory model. In one embodiment, a processor includes a load queue and a store queue and is configured to associate queue information with a load instruction in an instruction stream. In this embodiment, the queue information indicates a location of the load instruction in the load queue and one or more locations in the store queue that are associated with one or more store instructions that are older than the load instruction. The processor may determine, using the queue information, that the load instruction does not conflict with a store instruction in the store queue that is older than the load instruction. The processor may remove the load instruction from the load queue while the store instruction remains in the store queue. The queue information may include a wrap value for the load queue.

20 Claims, 6 Drawing Sheets

(56) References Cited

U.S. PATENT DOCUMENTS

| | | | | |
|---|---|---|---|---|
| 5,931,957 | A * | 8/1999 | Konigsburg | G06F 9/30043 712/216 |
| 5,999,727 | A * | 12/1999 | Panwar | G06F 9/30043 712/218 |
| 6,006,326 | A * | 12/1999 | Panwar | G06F 9/3834 711/167 |
| 6,021,485 | A * | 2/2000 | Feiste | G06F 9/3816 712/216 |
| 6,058,472 | A * | 5/2000 | Panwar | G06F 9/3861 712/214 |
| 6,463,522 | B1 * | 10/2002 | Akkary | G06F 9/3834 712/216 |
| 7,240,183 | B2 * | 7/2007 | Osanai | G06F 9/30043 711/210 |
| 7,434,031 | B1 * | 10/2008 | Spracklen | G06F 9/3826 712/217 |
| 7,555,634 | B1 * | 6/2009 | Thatipelli | G06F 9/383 712/216 |
| 7,590,825 | B2 * | 9/2009 | Krimer | G06F 9/3017 712/216 |
| 7,600,098 | B1 * | 10/2009 | Chou | G06F 9/3826 712/216 |
| 8,219,787 | B2 | 7/2012 | Lien et al. | |
| 8,447,911 | B2 * | 5/2013 | Burger | G06F 9/3824 711/5 |
| 8,549,263 | B2 * | 10/2013 | Krimer | G06F 9/3017 712/216 |
| 8,812,823 | B2 * | 8/2014 | Krimer | G06F 9/3017 712/216 |
| 9,383,995 | B2 * | 7/2016 | Kanapathipillai | G06F 9/30043 |
| 2002/0124156 | A1 * | 9/2002 | Yoaz | G06F 9/3834 712/225 |
| 2007/0226470 | A1 * | 9/2007 | Krimer | G06F 9/3017 712/225 |
| 2007/0288725 | A1 | 12/2007 | Luick | |
| 2008/0005533 | A1 * | 1/2008 | Altman | G06F 9/3834 712/23 |
| 2009/0013135 | A1 * | 1/2009 | Burger | G06F 9/3824 711/154 |
| 2009/0282202 | A1 * | 11/2009 | Krimer | G06F 9/3017 711/154 |
| 2010/0145969 | A1 * | 6/2010 | Wang | G06F 9/38 707/758 |
| 2010/0306508 | A1 * | 12/2010 | Day | G06F 9/30174 712/216 |
| 2010/0325395 | A1 * | 12/2010 | Burger | G06F 9/3838 712/216 |
| 2011/0035564 | A1 * | 2/2011 | Krimer | G06F 9/3017 711/167 |
| 2012/0060016 | A1 * | 3/2012 | Eichenberger | G06F 9/30018 712/4 |
| 2012/0110280 | A1 | 5/2012 | Bryant | |
| 2013/0073833 | A1 * | 3/2013 | Konigsburg | G06F 9/3838 712/205 |
| 2013/0326198 | A1 * | 12/2013 | Meier | G06F 9/3838 712/216 |
| 2013/0339711 | A1 * | 12/2013 | Kosarev | G06F 9/3834 712/245 |
| 2014/0244984 | A1 * | 8/2014 | Kaplan | G06F 9/3826 712/225 |
| 2014/0281409 | A1 * | 9/2014 | Abdallah | G06F 9/3834 712/216 |
| 2015/0006452 | A1 * | 1/2015 | Kim | G06F 9/3842 706/21 |
| 2015/0089186 | A1 * | 3/2015 | Kim | G06F 12/0215 711/213 |
| 2015/0309793 | A1 * | 10/2015 | Kurd | G06F 9/30043 712/225 |
| 2016/0103682 | A1 * | 4/2016 | Alexander | G06F 9/3834 711/125 |

OTHER PUBLICATIONS

'A Comparative Survey of Load Speculation Architectures' by Calder and Reinman, Journal of Instruction-Level Parallelism 1 (2000) pp. 1-39.*

'Speculation Techniques for Improving Load Related Instruction Scheduling' by Adi Yoaz et al., copyright 1999, IEEE.*

* cited by examiner

Associate queue information with a load instruction. The queue information indicates a location of the load instruction in a load queue and one or more store instructions in a store queue that are older than the load instruction
510

↓

Determine that the load instruction does not conflict with a set of store instructions in the store queue that are older than the load instruction
520

↓

Remove the load instruction from the load queue while at least one of the set of store instructions remains in the store queue
530

Associate queue information with a store instruction. The queue information indicates a location of the store instruction in a store queue and a location in a load queue that is associated with a next-youngest or next-oldest load instruction relative to the store instruction
560

↓

Determine that the store instruction does not conflict with a load instruction in the load queue that is younger than the store instruction
570

↓

Remove the load instruction from the load queue before removing the store instruction from the store queue
580

*FIG. 5B*

COMPLETING LOAD AND STORE INSTRUCTIONS IN A WEAKLY-ORDERED MEMORY MODEL

RELATED APPLICATIONS

The present application is related to U.S. application Ser. No. 13/750,972 entitled "Load Ordering In A Weakly-Ordered Processor", which is incorporated herein by reference in its entirety.

BACKGROUND

Technical Field

This disclosure relates to computer processors, and more particularly to techniques for completing load and store instructions in a weakly-ordered memory model.

Description of the Related Art

Modern out-of-order processors are often configured to execute load and store instructions out-of-order, and also permit loads to access memory in a speculative manner. Speculatively-executed loads and stores are typically held in queues until necessary criteria is met to make the loads and stores architecturally visible (i.e., visible to software). The order rules of memory accesses by various processors is defined by the memory consistency model specified by a given instruction set architecture (ISA). The weakly-ordered model is one such memory consistency model.

One relaxed rule of the weakly-ordered model is that younger loads are permitted to access memory and complete ahead of relatively older stores as long as memory-address based dependencies are adhered to.

SUMMARY

This disclosure techniques for completing load and store instructions in a weakly-ordered memory model. In some embodiments, younger load instructions are retired from a load queue ahead of older store instructions in a store queue. In some embodiments, a wrap value allows flexibility in load and store retirement.

In one embodiment, a processor includes a load queue and a store queue and is configured to associate queue information with a load instruction in an instruction stream. In this embodiment, the queue information indicates a location of the load instruction in the load queue and one or more locations in the store queue that are associated with one or more store instructions that are older than the load instruction. The processor may determine, using the queue information, that the load instruction does not conflict with a store instruction in the store queue that is older than the load instruction. The processor may remove the load instruction from the load queue while the store instruction remains in the store queue.

The queue information may include a wrap value for the load queue. The load instruction may be a number of load instructions younger than the store instruction that is greater than a number of entries in the load queue. The store instruction may be already retired from a reorder buffer when the processor removes the load instruction from the load queue.

In another embodiment, a processor includes a load queue and a store queue and is configured to associated queue information with a store instruction in an instruction stream. In this embodiment, the queue information indicates a location of the store instruction in the store queue and one or more load instructions in the load queue that are younger than the store instruction. The processor may determine, using the queue information, that the store instruction does not conflict with a particular load instruction in the load queue that is younger than the store instruction. The processor may retire the particular load instruction from the load queue while the store instruction is still in the store queue.

A dispatch unit may be configured to associate queue information with load and store instructions. The dispatch unit may include a load counter and a store counter. The processor may be configured to flush and/or replay a load instruction when a conflict is detected between the load instruction and an older store instruction.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Figure 1A:
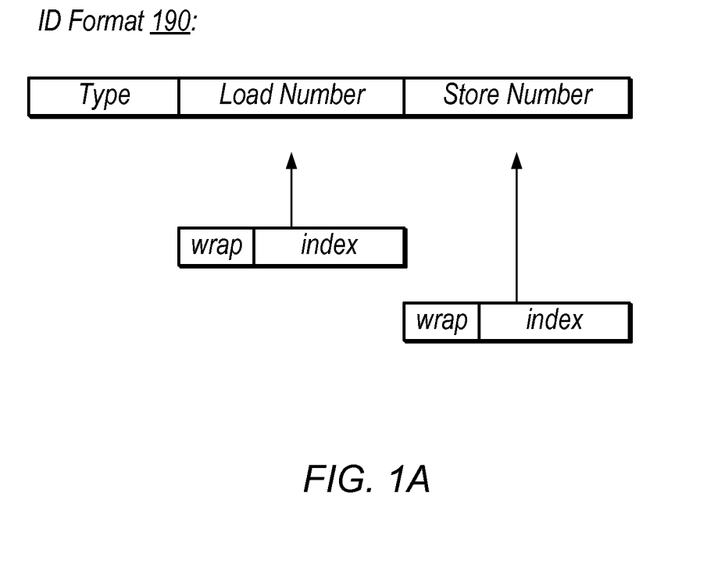
FIG. 1A is a block diagram illustrating one embodiment of an ID format for queue information for load and store instructions.

Referring to FIG. 1A, a block diagram illustrating one embodiment of an ID format 190 for queue information for load and store instructions is shown. In the illustrated embodiment, ID format 190 includes a type field, a load number, and a store number. In one embodiment, the type field indicates whether an instruction is a load or a store.

ID's may be assigned to load and store instructions while the instructions are still in program order (e.g., at or before a dispatch stage in a processing pipeline). The ID's may proceed along with an instruction through the processing pipeline and may be used to process load and store instructions in load and store queues (e.g., in a load/store unit).

For a load instruction, the load number indicates a location of the load in a load queue. In the illustrated embodiment, the index portion provides this indication. In the illustrated embodiment, the wrap portion of the load number indicates a current wrap value for the load queue. Wrap values are described in more detail below with reference to FIG. 3. For a load instruction, the store number indicates locations of one or more older store instructions relative to the load instruction in the instruction stream. In the illustrated embodiment, the index portion of the store number indicates the location of a next-oldest or next-youngest store in the store queue relative to the load instruction. In various embodiments, either implementation may be used (either next-oldest or next-youngest) in order to locate older store instructions in the store queue. In the illustrated embodiment, the wrap portion of the store number indicates a current wrap value for the store queue.

For a store instruction, the store number indicates a location of the store in a store queue. In the illustrated embodiment, the index portion provides this indication. For a store instruction, the load number indicates locations of one or more younger load instructions relative to the store instruction in the instruction stream. In the illustrated embodiment, the index portion of the store number indicates the location of a next-oldest or next-youngest load in the load queue relative to the load instruction. The wrap portions of the load number and store number may store wrap values for a load queue and a store queue respectively.

As used herein, the terms "older" and "younger" refer to relative ages of instructions in an instruction stream. Older instructions precede younger instructions in program order. For example, in instruction stream 250 of FIG. 2, ST_A is older than LD_C but younger than LD_B. Further, an instruction may be described as being a particular number of load/store instructions older/younger than another instruction. For example, LD_A is 2 load instructions older than LD_C and ST_C is 2 store instructions younger than ST_A. Using this convention, the number of instructions of other types (e.g., add, multiply, nop, etc.) in an instruction stream is irrelevant. Further, "older" data refers to data associated with a relatively older instruction while "newer" data refers to data associated with a relatively younger instruction. For example, an older store may write old data to a particular location while a younger store writes new data to the particular location.

The number of bits used to encode load numbers and store numbers may be the same or may be different. For example, load and store queues may include different numbers of entries, so the number of index bits used for load numbers and store numbers may be different. Also, a processor may use different numbers of bits for wrap values of load and store queues.

As used herein, the term "queue" refers to a storage element having a plurality of entries. Queues are often used to store data (e.g., data associated with instructions) while waiting for processing resources to become available or for particular events to occur. In some embodiments, queues are used to store instruction information in program order even though the instructions may be performed out of program order. Thus, queues do not always behave in a first-in-first-out (FIFO) manner. For example, if instruction information arrives out of program order but is removed in program order, the information may not be dequeued (or retired) in the same order in which it is enqueued. As used herein, the term "storage element" refers to any element configured to store one or more values in a volatile or non-volatile manner. Examples of storage elements include: registers, memories, latches, disks, etc.

Using ID format 190, a processing element may be configured to determine older/younger load/store instructions than a given load/store instruction in the load and store queues. This may allow conflict checking for speculatively-executed instructions and may be used to allow younger loads to retire ahead of older stores when there are no memory-address dependencies.

As used herein, the term "processing element" refers to various elements or combinations of elements configured to execute program instructions. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Figure 1B:
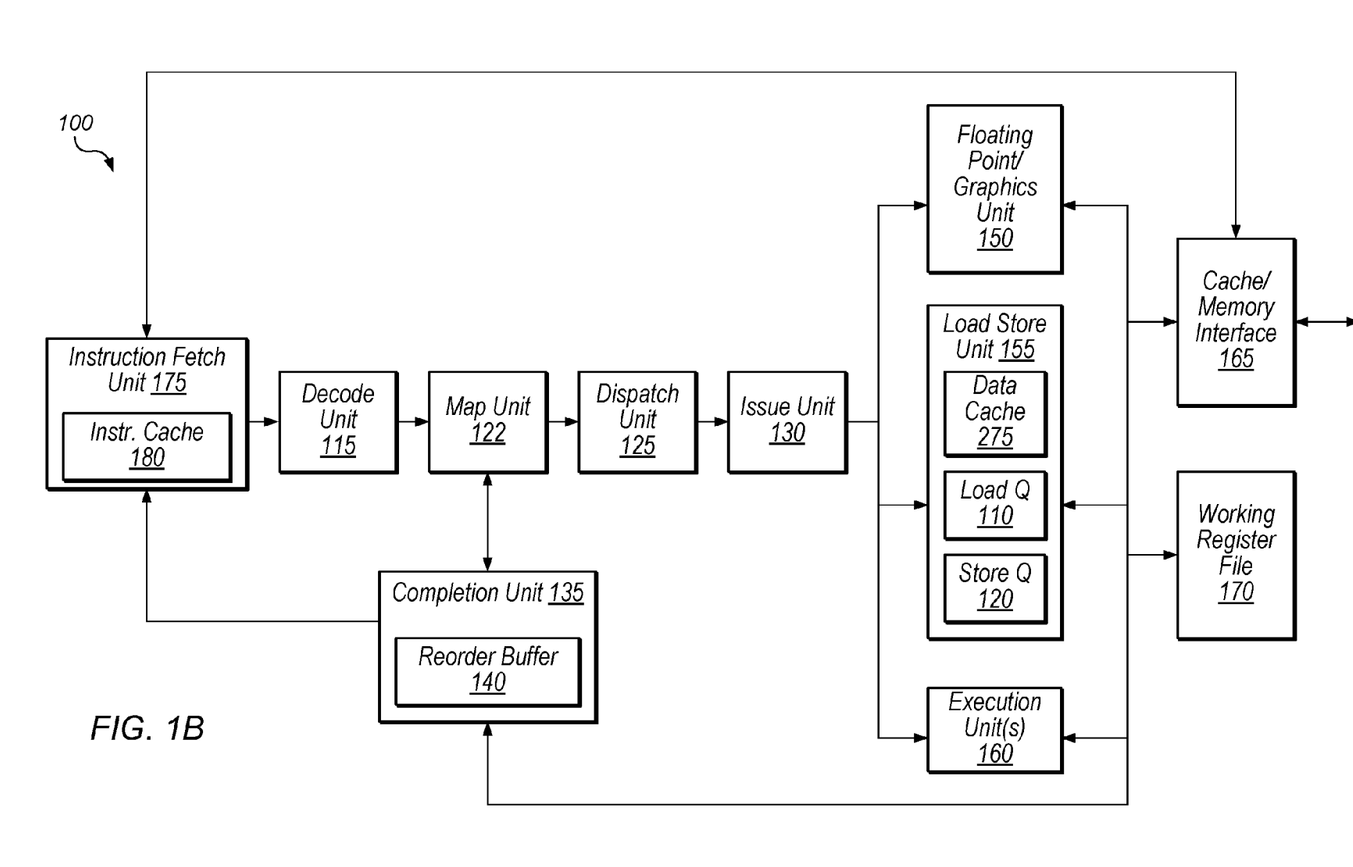
FIG. 1B is a block diagram illustrating one exemplary embodiment of a processing pipeline.

Referring now to FIG. 1B, a block diagram illustrating one embodiment of a pipeline of a processor 100 is shown. Processor 100 includes instruction fetch unit (IFU) 175 which includes instruction cache 180. IFU 175 is coupled to an exemplary instruction processing pipeline that begins with decode unit 115 and proceeds in turn through map unit 122, dispatch unit 125, and issue unit 130. Issue unit 130 is coupled to issue instructions to any of a number of instruction execution resources including: execution unit(s) 160, load/store unit (LSU) 155, and/or floating-point/graphics unit (FGU) 150. These instruction execution resources are coupled to working register file 170. Additionally, LSU 155 is coupled to cache/memory interface 165. Completion unit 135 is coupled to at least IFU 175, map unit 122, working register file 170, and the outputs of any number of instruction execution resources.

In the following discussion, exemplary embodiments of each of the structures of the illustrated embodiment of processor 100 are described. However, it is noted that the illustrated embodiment is merely one example of how processor 100 may be implemented. Alternative configurations and variations are possible and contemplated.

Instruction fetch unit 175 may be configured to provide instructions to the rest of the pipeline for execution. The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load/store unit). The latter meaning may also be referred to as "performing" the instruction. Thus, "performing" a load instruction refers to retrieving the value of the load's target location, which may, in some embodiments, be accomplished by a circuit at an execute stage of a pipeline (e.g., by a load/store unit). Conversely, "executing" the load instruction may refer to the entirety of operations that occur throughout the pipeline as a result of the load instruction. Instructions may be speculatively executed, and may be flushed and replayed if one or more conditions are not as speculated.

Further, as used herein, the term "target" in the context of load and store instructions refers to the location from which a load instruction should read or the location to which a store instruction should write. A target may be identified by a virtual address and/or a physical address. In some situations, instructions with the same target may not actually access the same storage element. For example, an older store may write information to a target location in a memory (or a cache) while a load reads from the same target by forwarding the data from the store without accessing a cache or memory. In this exemplary situation the load and the store both target the same target location (e.g., using the same memory address), but do not use the same storage element to access the target location. Further, an instruction may "target" a cache line when it targets a location in the cache line. Also, snoops often target a cache on a cache-line basis.

In one embodiment, IFU 175 is configured to fetch instructions from instruction cache 180 and buffer them for downstream processing, request data from a cache or memory through cache/memory interface 165 in response to instruction cache misses, and predict the direction and target of control transfer instructions (e.g., branches). In some embodiments, IFU 175 may include a number of data structures in addition to instruction cache 180, such as an instruction translation lookaside buffer (ITLB), instruction buffers, and/or structures configured to store state that is relevant to thread selection and processing (in multi-threaded embodiments of processor 100).

In one embodiment, decode unit 115 is configured to prepare fetched instructions for further processing. Decode unit 115 may be configured to identify the particular nature of an instruction (e.g., as specified by its opcode) and to determine the source and destination registers encoded in an instruction, if any. In some embodiments, decode unit 115 is configured to detect certain dependencies among instructions and/or to convert certain complex instructions to two or more simpler instructions for execution.

As used herein, the term "instruction" refers to information indicative of one or more operations to be performed by a processor pipeline. An "operation" may include a processing element doing nothing during a given processing cycle, e.g., based on a "nop" instruction or a conditional instruction for which the condition is false. An instruction may be defined by a given ISA. An instruction may also be defined by a microarchitecture rather than tied to a particular ISA. For example, decode unit 115 may be configured to decode an ISA instruction into one or more micro-operations, which may also be referred to as "instructions" when they specify an operation to be performed by a processor pipeline. Thus, a "load instruction" may or may not be defined by an ISA. A load instruction includes information indicative that a load operation is to be performed and typically includes information indicating a load's target memory location.

Register renaming may facilitate the elimination of certain dependencies between instructions (e.g., write-after-read or "false" dependencies), which may in turn prevent unnecessary serialization of instruction execution. In one embodiment, map unit 122 is configured to rename the architectural destination registers specified by instructions of a particular ISA by mapping them to a physical register space, resolving false dependencies in the process. In some embodiments, map unit 122 maintains a mapping table that reflects the relationship between architectural registers and the physical registers to which they are mapped. Map unit 122 may also maintain a "free list" of available (i.e. currently unmapped) physical registers.

Once decoded and renamed, instructions may be ready to be scheduled for performance. In the illustrated embodiment, dispatch unit 125 is configured to schedule (i.e., dispatch) instructions that are ready for performance and send the instructions to issue unit 130. In one embodiment, dispatch unit 125 is configured to maintain a schedule queue that stores a number of decoded and renamed instructions as well as information about the relative age and status of the stored instructions. For example, taking instruction dependency and age information into account, dispatch unit 125 may be configured to pick one or more instructions that are ready for performance.

In one embodiment, dispatch unit 125 includes a load counter and a store counter. In this embodiment, dispatch unit 125 is configured to assign load numbers and store numbers to load and store instructions using ID format 190 as described above with reference to FIG. 1A. Dispatch unit may receive instructions in program order, but instructions may be dispatched and further executed out of program order at least until arriving at load queue 110 and store queue 120.

Issue unit 130 may be configured to provide instruction sources and data to the various execution units for picked (i.e. scheduled or dispatched) instructions. In one embodiment, issue unit 130 includes reservation stations for storing instructions while waiting for their operands and/or for other processing resources to become available. In other embodiments, issue unit 130 provides instructions to reservation stations distributed among FGU 150, LSU 155, execution unit(s) 160, etc. In one embodiment, issue unit 130 is configured to read source operands from the appropriate source, which may vary depending upon the state of the pipeline. For example, if a source operand depends on a prior instruction that is still in the execution pipeline, the operand may be bypassed or forwarded directly from the appropriate execution unit result bus. Results may also be sourced from register files representing architectural (i.e., user-visible) as well as non-architectural state. In the illustrated embodiment, processor 100 includes a working register file 170 that may be configured to store instruction results (e.g., integer results, floating-point results, and/or condition code results) that have not yet been committed to architectural state, and which may serve as the source for certain operands. The various execution units may also maintain architectural integer, floating-point, and condition code state from which operands may be sourced.

Instructions issued from issue unit 130 may proceed to one or more of the illustrated execution units to be performed. In one embodiment, each of execution unit(s) 160 is similarly or identically configured to perform certain integer-type instructions defined in the implemented ISA, such as arithmetic, logical, and shift instructions. In some embodiments, architectural and non-architectural register files are physically implemented within or near execution unit(s) 160. It is contemplated that in some embodiments, processor 100 may include any number of integer execution units, and the execution units may or may not be symmetric in functionality.

Load/store unit 155 may be configured to process data memory references, such as integer and floating-point load and store instructions and other types of memory reference instructions. In the illustrated embodiment, LSU 155 includes data cache 275, load queue 110, and store queue 120. LSU 155 may be configured to detect misses in data cache 275 and to responsively request data from a cache or memory through cache/memory interface 165. Data cache 275 may be configured as a write-through cache or as a write-back cache. Data cache 275 may include multiple cache indices and ways. In some embodiments, LSU 155 may implement a hardware prefetcher configured to predict and prefetch data that is likely to be used in the future, in order to increase the likelihood that such data will be resident in a data cache when it is needed.

In some embodiments, load queue 110 and store queue 120 are respectively configured to queue load and store instructions until their results can be committed to the architectural state of the processor. Instructions in the queues may be speculatively performed, non-speculatively performed, or waiting to be performed. Each queue may include a plurality of entries, which may store loads/stores in program order. Load queue 110 and store queue 120 are described in greater detail below with reference to FIG. 2.

In one embodiment, LSU 155 attempts to speculatively perform loads as soon as they arrive. However, LSU 155 may retry speculatively-executed loads based on older conflicting stores and cache line migrations, for example. In some embodiments, LSU 155 may not speculatively execute loads when particular conditions persist when the loads arrive at LSU 155. Such loads may reside in load queue 110 while waiting to be performed.

In various embodiments, LSU 155 may implement a variety of structures configured to facilitate memory operations. For example, LSU 155 may implement a data TLB to cache virtual data address translations. LSU 155 may also include hardware configured to support atomic load-store instructions, memory-related exception detection, and read and write access to special-purpose registers (e.g., control registers).

Floating-point/graphics unit (FGU) 150 may be configured to perform and provide results for certain floating-point and graphics-oriented instructions defined in the implemented ISA. For example, in one embodiment FGU 150 implements single- and double-precision floating-point arithmetic instructions compliant with the IEEE floating-point standards, such as add, subtract, multiply, divide, and certain transcendental functions.

In the illustrated embodiment, completion unit 135 includes reorder buffer (ROB) 140 and coordinates transfer of speculative results to the architectural state of processor 100. Entries in ROB 140 may be allocated in program order. Completion unit 135 may include other elements for handling completion/retirement of instructions and/or storing history including register values, etc. As used herein, the terms "complete" and "completion" in the context of an instruction refer to commitment of the instruction's result(s) to the architectural state of a processor or processing element. For example, in one embodiment, completion of an add instruction includes writing the result of the add instruction to a destination register. Similarly, completion of a load instruction includes writing a value (e.g., a value retrieved from a cache or memory) to a destination register or a representation thereof.

In some embodiments, speculative results of instructions may be stored in ROB 140 before being committed to the architectural state of processor 100, and confirmed results may be committed in program order. Entries in ROB 140 may be marked as completed when their results are allowed to be written to the architectural state. Completion unit 135 may also be configured to coordinate instruction flushing and/or replaying of instructions. "Flushing," as used herein, refers to removing an instruction from execution in a processor pipeline; accordingly, execution of an instruction that is flushed is not completed. For example, an instruction may be flushed because it was speculatively fetched based on a mispredicted branch. "Replaying" or "retrying" as used herein, refers to re-performing a speculatively-performed instruction. For example, a speculatively-performed load from a particular location in memory may be re-performed in response to detecting a store to the particular location that is earlier in program order than the load. Replaying or retrying may occur after a flush or independently of a flush. Flushing and replaying may involve rewinding execution of an instruction. "Rewinding," as used herein, refers to undoing operations performed during execution of an instruction. For example, rewinding may include un-mapping physical registers and destination registers, marking results as invalid, removing entries from ROB 140, etc.

In one embodiment, completion unit 135 is configured to retire/remove a store instruction from ROB 140 and post it to store queue 120 before the store instruction has actually written its store-data. This may improve processing speed by allowing other instructions to retire instead of waiting for the store to complete. Stores may often complete slowly since they may wait for a write to a cache or memory and may require coherency procedures. Posted store instructions may reside in store queue 120 until they have actually written their results (after completion unit 135 has determined that the store instructions have not caused any exceptions and dependencies are resolved). Thus, posted store instructions may not be considered completed until they are removed from store queue 120.

In some embodiments, load instructions that have forwarded their retrieved data (e.g., to processor registers) may be retired from ROB 140 and dequeue from load queue 110 even if there are older posted stores remaining in the store queue. For example, in one embodiment, processor 100 is configured to attempt to retire multiple load instructions and multiple store instructions from load queue 110 and store queue 120 every cycle. Allowing younger load instructions to dequeue ahead of older posted stores may allow for efficient use of processing resources (e.g., actually retiring multiple load instructions each cycle rather than stalling) while waiting for posted stores to complete.

Figure 2:
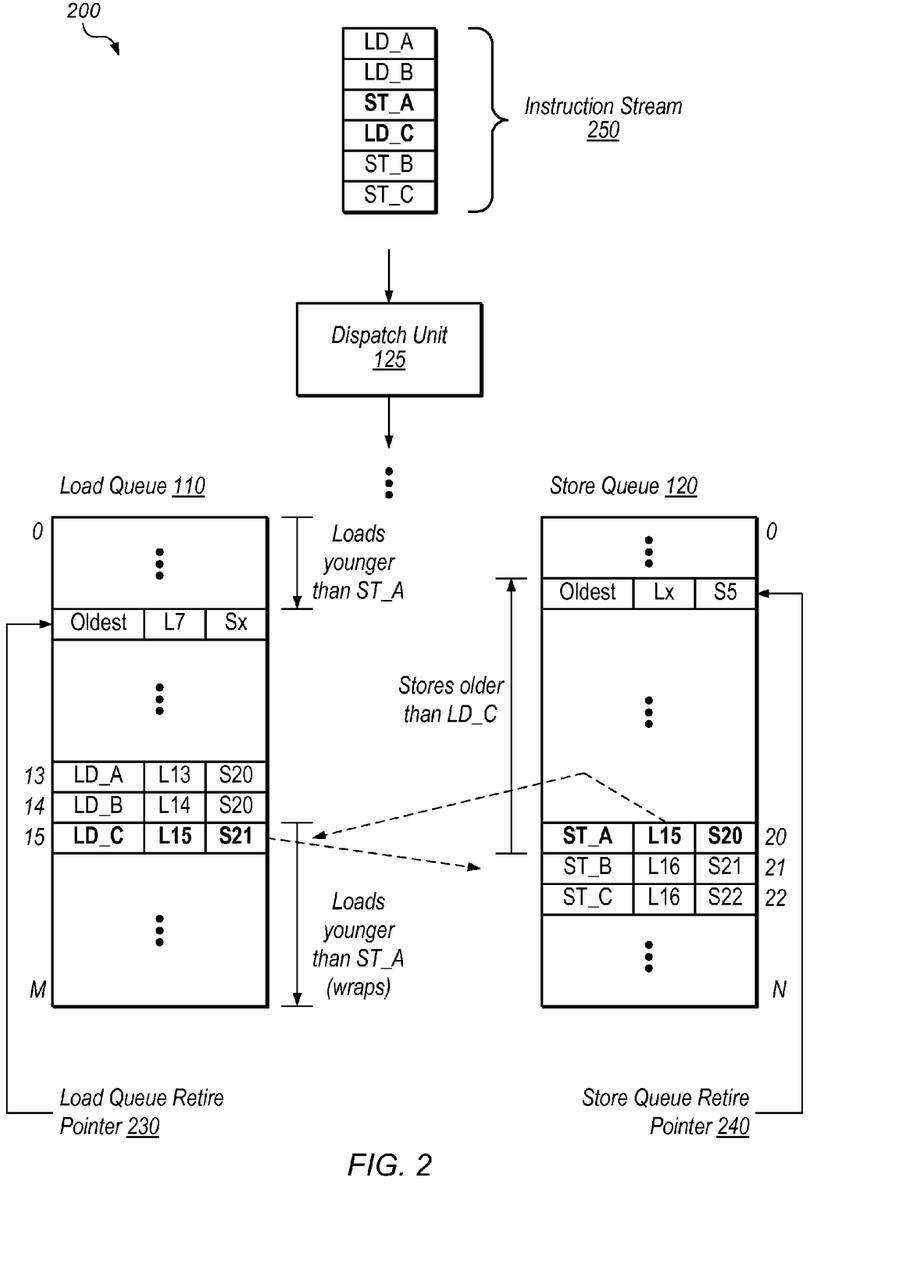
FIG. 2 is a block diagram illustrating one embodiment of a system that includes a load queue and a store queue.

Referring now to FIG. 2, a block diagram illustrating one embodiment of a system 200 that includes a load queue and a store queue is shown. In the illustrated embodiment, system 200 is configured to execute instructions of instruction stream 250. Dispatch unit 125 may assign queue information to load and store instructions according to the format 190 of FIG. 1A. In the illustrated embodiment, the queue information is used to arrange load and store instructions in load queue 110 and store queue 120.

In the illustrated embodiment, dispatch unit 125 is configured to associate queue information with loads and stores as they arrive in program order. In other embodiments, other processing elements may perform such association. In the illustrated example, dispatch unit 125 has assigned load number L13 to LD_A, L14 to LD_B, and L15 to LD_C and has assigned store number S20 to ST_A, S21 to ST_B, and S22 to ST_C. A load's load number may be used to index into the load queue and a store's store number may be used to index into the store queue. Thus, LD_A is assigned load number L13 and resides at index 13, for example.

In this embodiment, dispatch unit 125 is also configured to assign load numbers to stores and store numbers to loads. In the illustrated embodiment, a store's load number refers to the next-youngest load relative to the store. Thus ST_A's load number refers to LD_C. In other embodiments, a store's load number refers to the next-oldest load relative to the store. In these embodiments, ST_A's load number would refer to LD_B.

In the illustrated embodiment, a load's store number refers to the next-youngest store relative to the load. Thus, LD_C's store number refers to ST_B. In other embodiments, a load's store number refers to the next-oldest store relative to the load. In these embodiments, LD_C's store number would refer to ST_A.

In one embodiment, dispatch unit 125 includes a load counter and a store counter. In this embodiment, dispatch unit 125 is configured to assign store numbers from the store counter, which increments each time a store is received. Similarly, dispatch unit 125 is configured to assign load numbers from the load counter, which increments each time a load instruction is received. After associating queue information with load and store instructions, dispatch unit 125 may dispatch instructions to an issue unit and/or other processing elements in a processing pipeline. Dispatched load and store instructions may be processed out-of-order before arriving and load queue 110 or store queue 120 in LSU 155.

In the illustrated embodiment, load queue retire pointer (LRP) 230 indicates the oldest load instruction currently residing in load queue 110. Similarly, store queue retire pointer (SRP) indicates the oldest store instruction currently residing in store queue 120. In this embodiment, when instructions are committed to the architectural state of a processor, they are removed from the queue and the appropriate retire pointer is incremented. In the illustrated embodiment, load queue 110 and store queue 120 are configured as circular queues. Thus, when LRP 230 reaches entry M in store queue 110, it wraps back to location 0 after the instruction at entry M is retired.

In one embodiment, when a load instruction reaches LSU 155, LSU 155 is configured to use the load's store number to probe for older stores in store queue 120. For example, when LD_C arrives, LSU 155 may examine stores between (and including) ST_A and the oldest store in the queue based on LD_C's store number and SRP 240. In one embodiment, LSU 155 checks for conflicts with older stores and/or checks for older stores of a particular type. If there are conflicts or stores of a particular type, LSU 155 may wait to perform the load (or retry the load if it has already been performed). Thus, some entries in load queue 110 may store load instructions that have not been performed. Such entries may include an indicator that the load instruction is in a wait state, and may include an ID. When the instruction or condition causing the conflict is resolved, store queue 120 may broadcast the appropriate ID and LSU 155 may perform waiting loads with a matching ID.

As used herein, the term "conflict" refers to a situation in which memory access instructions target the same memory location in a particular order. For example, if LD_C and ST_A target the same location, and LD_C arrives at LSU 155 before ST_A, we describe LD_C as conflicting with ST_A. In one embodiment LSU 155 would speculatively perform LD_C and then replay LD_C when ST_A arrives. In another embodiment, LSU 155 would wait to perform LD_C until ST_A arrives. This situation may be referred to as a "read after write" hazard. Other types of conflicts/hazards include "write after read" and "write after write."

In order to detect conflicts, each entry in load queue 110 and store queue 120 may include an address of its target location. At least a portion of the address field may be implemented using content addressable memory (CAM). Thus, LSU 155 may provide a load's target address to the CAM fields of older stores in store queue 120 to determine whether any older loads to the same location reside in store queue 120. In some situations, a younger load may arrive at load queue 110 when older stores have not yet arrived at store queue 120. In this situation, in some embodiments, LSU 155 may speculatively execute such younger a load store it in load queue 110, but may not allow it to retire until all older stores have reached store queue 120 so that the younger load can be checked for dependencies.

In one embodiment, when a store instruction reaches LSU 155, LSU 155 is configured to use the store's load number to probe for younger loads in load queue 110. For example, when ST_A arrives, LSU 155 may examine loads between (and including) LD_C and the oldest load in load queue 110 based on ST_A's load number the SRP 240 (the younger loads wrap as shown in FIG. 2). If there are conflicts, a younger load that conflicts with the store may be replayed. In some embodiments, such younger stores may be flushed and replayed.

Generally, the size of load queue 110 and store queue 120 may determine how many load/store instructions can be dispatched or sent to reservation stations. For example, in the illustrated embodiment, load queue 110 includes M entries, so dispatch unit 125 can dispatch load instructions having a load number of up to L7+M (because L7 is the load number of the current oldest load in the load queue). Similarly, dispatch unit 125 can dispatch stores having a store number of up to S5+N in the illustrated situation and embodiment in which store queue 120 includes N entries. Load queue 110 and store queue 120 may include the same number of entries or different numbers of entries.

Figure 3:
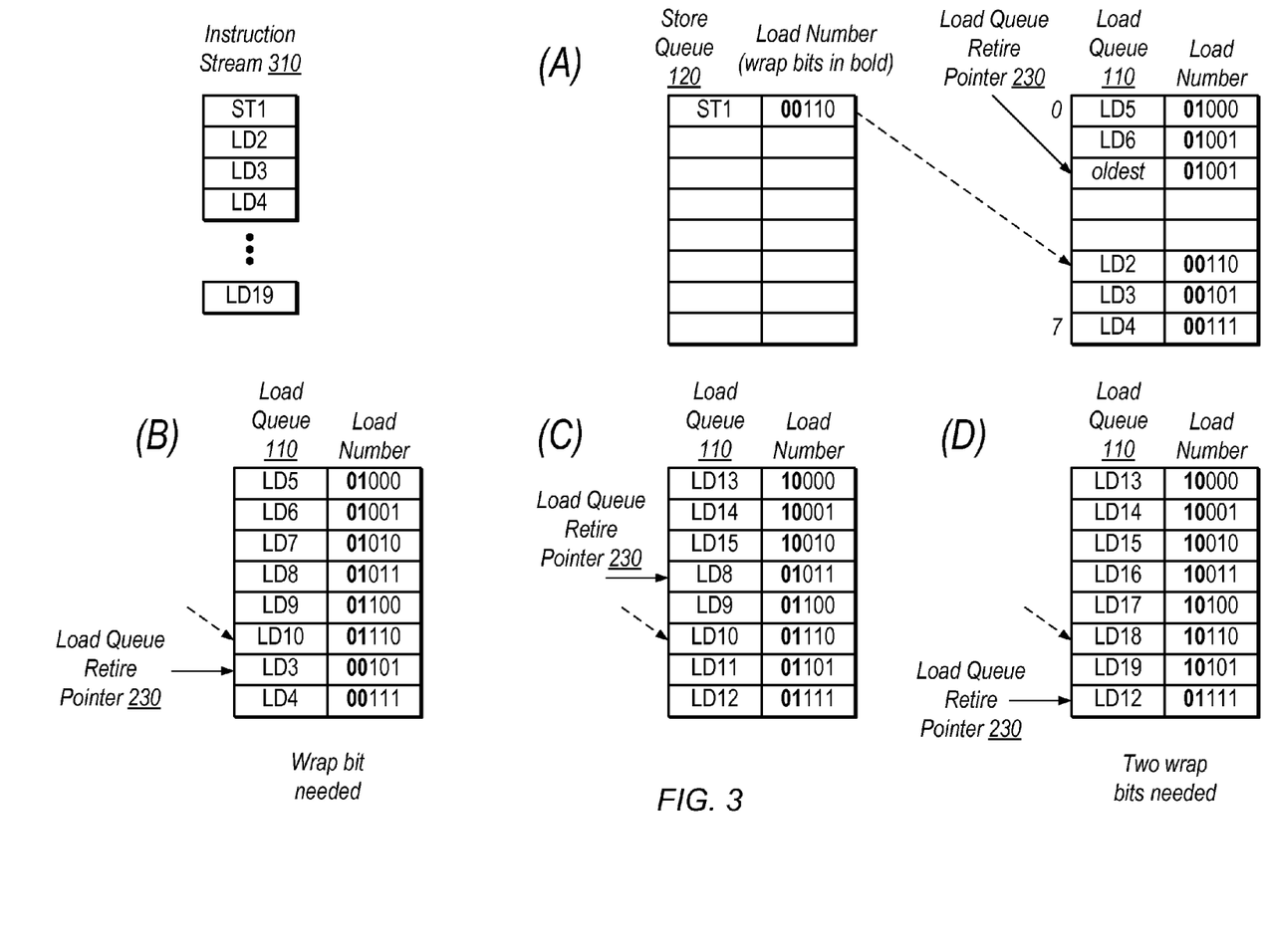
FIG. 3 is a diagram illustrating one example of load and store instruction processing.

Referring now to FIG. 3, a diagram illustrating one example of load and store instruction processing is shown. Diagram portions (A), (B), (C), and (D), represent snapshots of load queue 110 at different points in time during exemplary processing.

When load queue 110 and store queue 120 are implemented as circular queues, a wrap bit may be necessary in order to maintain relative instruction order when a wrap has occurred. Further, to allow loads to retire more than a load-queue's worth of loads ahead of older stores, additional wrap bits may be used. One simple explanation of the need for more wrap bits is that re-using the same load number for different loads results in losing the ability to distinguish between relatively younger and older loads. FIG. 3 illustrates an exemplary situation in which this problem occurs. The queues in FIG. 3 include only eight entries for illustrative purposes, but in various embodiments, any appropriate queue sizes may be implemented.

In the example of FIG. 3, instruction stream 310 includes store instruction ST1 followed by load instructions LD2 through LD19. In the illustrated embodiment, ST1 receives load number '00110' (binary), which indicates the location of LD2 (the next-youngest load). In the illustrated embodiment, the lower three bits of the load number are used to index into location '110' in load queue 110 and the upper two bits (shown in bold) of the load number store the wrap value '00' of the load queue.

At time (A), none of loads LD2 through LD19 have retired/dequeued, and LSU 155 can determine that loads between (and including) LD2 and LRP 230 are younger tan ST1 (i.e., LD2-LD6 and the 'oldest' load in load queue 110). In this example, the current oldest load occurred at some point before ST1 in instruction stream 310.

At time (B), LSU 155 has retired LD2 and replaced it with LD10 in load queue 110. At this point, at least one wrap bit is necessary, because otherwise LSU 155 might incorrectly determine that only LD3 and LD10 were younger than ST1 (generally LSU 155 may be configured to find older instructions by proceeding from a given load number through the load queue until LRP 230 is reached). Said another way, without wrap bits, the index "110" would be re-used such that LSU 155 could not distinguish relative ages between LD2 and LD10. However, by detecting that the wrap value at location 110 (the index pointed to by ST1's store number) indicates one wrap beyond ST1's wrap value ('01' is greater than '00' by one), LSU 155 can determine that a wrap has occurred and that all the entries in load queue 110 at time (B) are younger than ST1.

At time (C), LSU 155 has dequeued loads through LD8. At time (D), a single wrap bit is no longer enough to maintain relative age. If only the less-significant wrap bit were used, the wrap bits match and LSU 155 could not determine that any wraps have occurred. With only one wrap bit, LSU 155 might incorrectly determine that only LD12, LD18, and LD19 were younger than ST1. However, using two wrap bits, LSU 155 can determine that all the entries in load queue 110 at time (D) are younger than ST1.

Generally, N bits of wrap information allow detection of up to $2^N-1$ wraps. Thus, using additional wrap bits in load numbers may allow loads run ahead of older stores by multiple load queue's worth of loads in the absence of memory-address conflicts. For example, load queue 110 of FIG. 3 includes 8 entries, but LD11 can be retired ahead of ST1 (LD11 is more than 8 loads younger than ST1) if two wrap bits are used.

Similarly, store numbers may similarly include extra wrap bits in wrap values. This may allow stores to efficiently retire in instruction streams with a relatively large number of stores. For example, consider a situation in which an instruction stream includes 80 stores (with no loads between them) and store queue 120 includes 32 entries. If only a single wrap bit were used, only a store queue's worth of loads could be issued before potentially losing track of relative age between load and store instructions. However, using additional wrap bits may allow multiple store queue's worth of loads to issue and retire.

As used herein, the term "wrap value" refers to a value indicating a current one of N iterations through the entries of a load/store queue having M entries, where N and M are both integers greater than or equal to two. For example, consider a load queue having 32 entries. A corresponding counter value used to assign a load number might have 8 bits. The least significant 5 bits would be used to indicate a location value (i.e., the current location in the load queue), while the most significant 3 bits would make up the wrap value and be used to differentiate between instructions associated with up to 8 different iterations through the load queue.

Note that the ST1 is shown residing in store queue 120 at time (A), but ST1 may arrive at store queue 120 at any of points A, B, C, D, or some other point in time because of out-of-order execution. Thus, LSU 155 is configured to determine what loads in load queue 110 are younger than ST1 whenever ST1 arrives.

Figure 4:
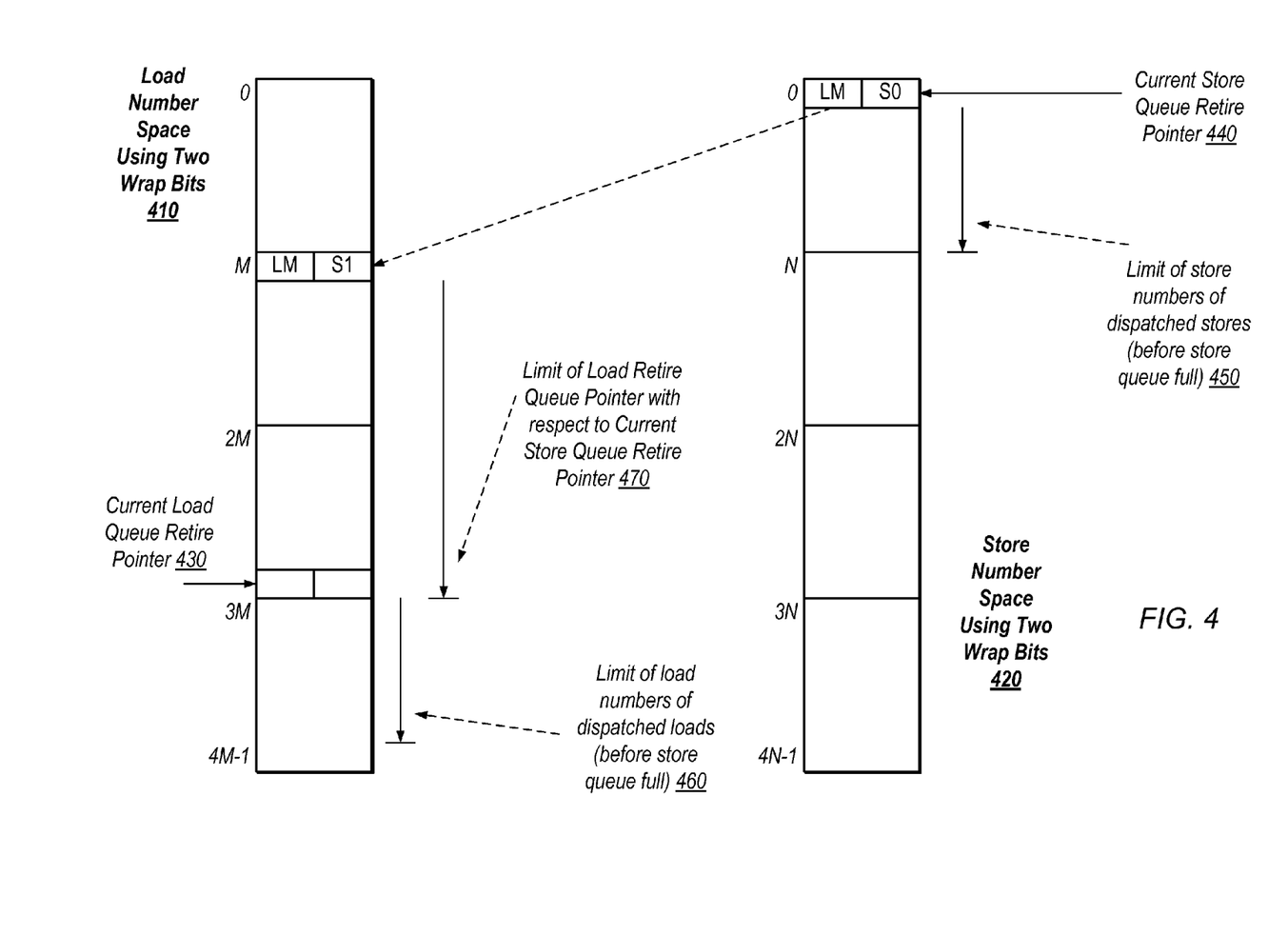
FIG. 4 is a diagram illustrating exemplary load and store number spaces.

Referring now to FIG. 4, a diagram illustrating exemplary load and store number spaces when using two wrap bits is shown. Note that in other embodiments, different numbers of wrap bits may be used for load numbers and store numbers. For example, in some embodiments, a single wrap bit may be used for store numbers while a greater number of wrap bits may be used for load numbers.

In the illustrated embodiment, load number space 410 corresponds to a load queue having M entries and store number space 420 corresponds to a store queue having N entries. Each space includes 4 times the number of entries in the corresponding queue because two wrap bits are used. In the example of FIG. 4, the current SRP 440 indicates index 0 in the store queue, which contains a store with store number S0. This store points to a next-youngest load LM in load number space 410. In the illustrated example, LSU 155 is configured to limit the current LRP 430 to within two times the number of entries in the load queue from current SRP 440 (the limit is indicated by element 470). In other words, LSU 155 is configured not retire load instructions after that point until SRP 440 is incremented. Elements 450 and 460 show the limits of issued loads and stores based on the current LRP 430 and SRP 440 to ensure that the queues do not overflow. Thus, in this implementation, loads can be dispatched up to 3 times the number of loads in the load queue ahead of the current SRP 440. In other implementations, more wrap bits may be used and loads may run even further ahead of older stores. Using wrap bits instead of simply using a larger load queue may be desirable in order to reduce chip area and because CAM's are generally expensive.

In some embodiments, load queue 110 and/or store queue 120 may not include a number of entries that is a power of 2. For example, a load queue may include 24 entries. In this situation a load or store counter may be configured to skip a range of values when a wrap occurs. For example, the load counter may be configured to skip from 23 to 32 in order to correctly maintain index and wrap bits for a 24 entry load queue.

Figure 5A:
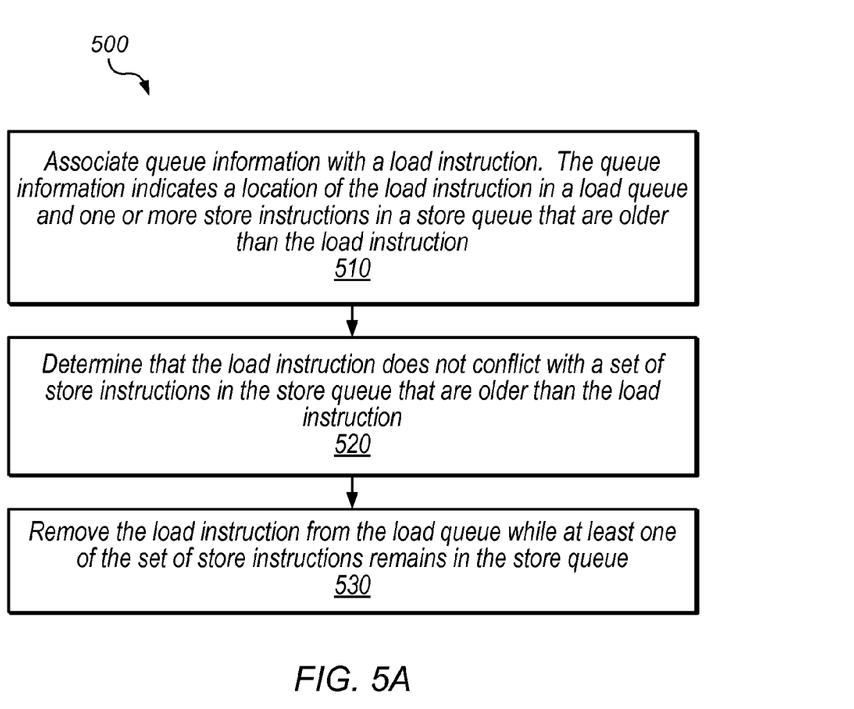
FIG. 5A is a flow diagram illustrating one embodiment of a method for completing a load instruction.

Referring now to FIG. 5A, a flow diagram illustrating one exemplary embodiment of a method 500 for completing a load instruction is shown. The method shown in FIG. 5A may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 510.

At block 510, queue information is associated with a load instruction. The queue information indicates a location of the load instruction in a load queue and one or more instructions in a store queue that are older than the load instruction. For example, the queue information may include a load number and a store number. The store number may indicate a location associated with a next-oldest or next-youngest store instruction relative to the load instruction. Flow proceeds to block 520.

At block 520, it is determined that the load instruction does not conflict with a set of store instructions in the store queue that are older than the load instruction. The set of store instructions may consist of a single store instruction or may comprise multiple store instructions. LSU 155 may determine that the load instruction does not conflict with the set of store instructions by probing for older store instructions using a store number in the queue information and comparing an address of the load instruction with addresses of store instructions in the set of store instructions. In some situations, some of the set of store instructions may not have yet arrived at store queue 120 and LSU 155 may wait until all store instructions older than the load instruction have arrived before proceeding to block 530. Flow proceeds to block 530.

At block 530, the load instruction is removed from the load queue while at least one of the set of store instructions remains in the store queue. Said another way, the load instruction completes ahead of at least one older store instruction, completing out of program order. In embodiments implementing a wrap value, there may be a number of load instructions in an instruction stream between the load instruction and the store instruction that is greater than a number of entries in the load queue. Flow ends at block 530.

Figure 5B:
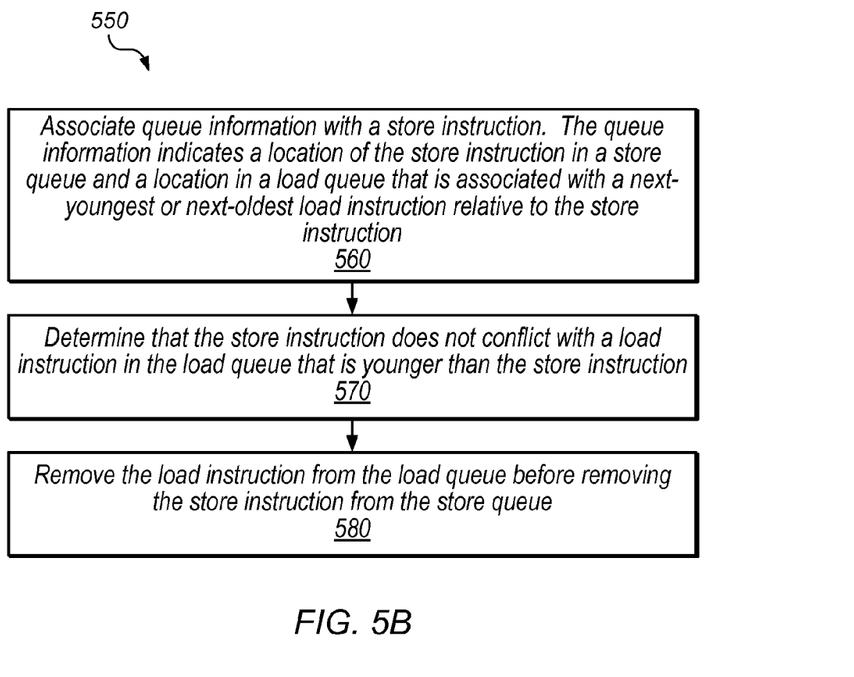
FIG. 5B is a flow diagram illustrating another embodiment of a method for completing a load instruction.

Referring now to FIG. 5B, a flow diagram illustrating another exemplary embodiment of a method 550 for completing a load instruction is shown. The method shown in FIG. 5B may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 560.

At block 560, queue information is associated with a store instruction. The queue information indicates a location of the store instruction in a store queue and a location in a load queue that is associated with a next-youngest or next-oldest load instruction relative to the store instruction. For example, the next-youngest or next-oldest load instruction may reside at the location once it has arrived at the store queue and until it is retired. Flow proceeds to block 570.

At block 570, it is determined that the store instruction does not conflict with a load instruction in the load queue that is younger than the store instruction. LSU 155 may determine that the store instruction does not conflict with the load instruction by probing for older load instructions using a load number in the queue information and comparing an address of the store instruction with an address of the load instruction. Flow proceeds to block 580.

At block 580, the load instruction is removed from the load queue before removing the store instruction from the store queue. In embodiments implementing a wrap value, the load instruction may be a number of load instructions younger than the store instruction that is greater than a number of entries in the load queue. Flow ends at block 580.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A processor, comprising:
   a load queue; and
   a store queue;
   wherein the processor is configured to:
      associate queue information with a load instruction in an instruction stream being executed by the processor, wherein the queue information indicates a location of the load instruction in the load queue, and wherein the queue information indicates one or more locations in the store queue that are associated with one or more store instructions that are older than the load instruction;
      determine, prior to performing the load instruction and using the queue information, that the load instruction does not conflict with a store instruction in the store queue that is older than the load instruction, wherein the determination is based on target addresses of the load instruction and the store instruction; and
      remove the load instruction from the load queue, subsequent to performing the load instruction, while the store instruction remains in the store queue.

2. The processor of claim 1, wherein the queue information further indicates a current wrap value for the load queue.

3. The processor of claim 1,
   wherein the load queue includes a first number of entries;
   wherein the load instruction is a second number of load instructions younger than the store instruction that remains in the store queue; and
   wherein the second number is greater than the first number.

4. The processor of claim 1,
   wherein the load instruction targets a particular address; and
   wherein, to determine that the load instruction does not conflict with the store instruction, the processor is configured to determine whether the store instruction targets the particular address.

5. The processor of claim 1, wherein the store instruction is retired from a reorder buffer for at least a portion of the time the store instruction resides in the store queue.

6. The processor of claim 1, further comprising:
   a dispatch unit configured to associate the queue information with the load instruction and receive program instruction in program order.

7. The processor of claim 1, wherein the queue information includes:
   a load number indicative of a location of the load instruction in the load queue; and
   a store number indicative of a location associated with a next-youngest or next-oldest store instruction in an instruction stream, relative to the load instruction, in the store queue.

8. The processor of claim 1, wherein the processor is configured to remove the load instruction from a reorder buffer while the store instruction remains in the store queue.

9. A method, comprising:
   associating queue information with a load instruction in an instruction stream being executed by a computer processor, wherein the queue information indicates a location of the load instruction in a load queue, and wherein the queue information indicates one or more store instructions in a store queue that are older than the load instruction;
   determining, prior to performing the load instruction using the queue information for the load instruction, that the load instruction does not conflict with a set of store instructions in the store queue that are older than the load instruction, wherein the determining is based on target addresses of the load instruction and the set of store instructions; and removing the load instruction from the load queue, subsequent to performing the load instruction, while at least one of the set of store instructions remains in the store queue.

10. The method of claim 9, wherein the queue information further indicates a current wrap value for the load queue.

11. The method of claim 10, wherein the wrap value is represented using a plurality of bits.

12. The method of claim 9, wherein the associating is performed by a dispatch unit.

13. The method of claim 9, wherein the determining and the removing are performed by a load/store unit.

14. The method of claim 9,
wherein the load queue includes a first number of entries;
wherein there are a second number of load instructions in the instruction stream between the load and at least one of the set of store instructions remaining in the store queue; and
wherein the second number is greater than the first number.

15. A processor, comprising:
a load queue; and
a store queue;
wherein the processor is configured to:
    associate queue information with a store instruction in an instruction stream being executed by the processor, wherein the queue information indicates a location of the store instruction in the store queue, and wherein the queue information indicates one or more load instructions in the load queue that are younger than the store instruction;
    determine, using the queue information, that the store instruction does not conflict with a particular load instruction in the load queue that is younger than the store instruction, prior to performing the particular load instruction, wherein the determination is based on target addresses of the load instruction and the store instruction; and
    retire the particular load instruction from the load queue, subsequent to performing the load instruction, while the store instruction is still in the store queue.

16. The processor of claim 15, wherein the queue information further indicates a current wrap value for the store queue and a current wrap value for the load queue.

17. The processor of claim 16, wherein the current wrap value for the load queue is represented using a plurality of bits.

18. The processor of claim 15, wherein the processor is further configured to:
    determine, using the queue information, that the store instruction conflicts with one or more load instructions in the load queue that are younger than the store instruction; and
    replay the one or more load instructions in response to the determination.

19. The processor of claim 15,
wherein the load queue includes a first number of entries;
wherein the processor is configured to execute a second number of load instructions in the instruction stream between the store instruction and the particular load instruction; and
wherein the second number is greater than the first number.

20. The processor of claim 15, further comprising:
a load counter; and
a store counter;
wherein the queue information includes a load number assigned using the load counter and a store number assigned using the store counter.

* * * * *